PATTERN RECOGNITION SYSTEMS

Filed June 14, 1962

3 Sheets-Sheet 1

INVENTORS.
WILLIAM H. DUNN
CURT F. FEY
LAVEEN N. KANAL
WILLIAM L. McDERMID
DONALD F. SMITH

BY F. L. Styner
ATTORNEY

Sept. 27, 1966 W. H. DUNN ET AL 3,275,986

PATTERN RECOGNITION SYSTEMS

Filed June 14, 1962 3 Sheets-Sheet 2

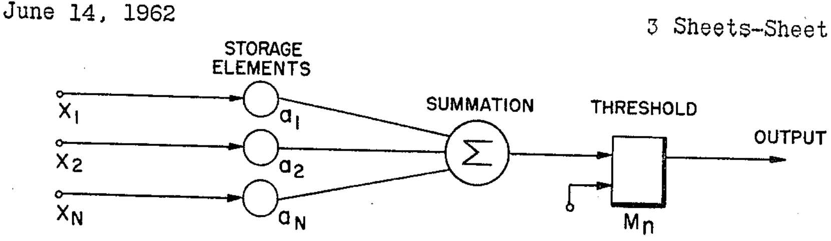
Fig. 3
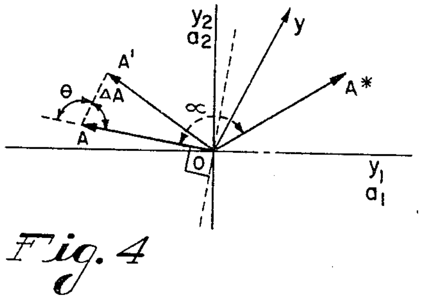
Fig. 4
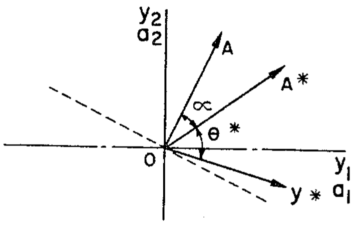
Fig. 5
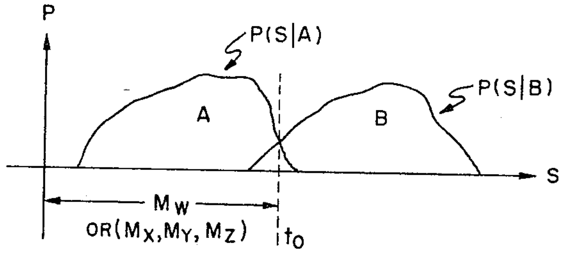
Fig. 6
| PATTERN CLASS | OUTPUTS (CODE 1) W | X | Y | OUTPUTS (CODE 2) W | X | Y |
|---|---|---|---|---|---|---|
| A's | 1 | 0 | 0 | 0 | 0 | 0 |
| B's | 0 | 1 | 0 | 0 | 0 | 1 |
| C's | 0 | 0 | 1 | 0 | 1 | 0 |
| D's | | | | 0 | 1 | 1 |
| E's | | | | 1 | 0 | 0 |
| F's | | | | 1 | 0 | 1 |
| G's | | | | 1 | 1 | 0 |
| H's | | | | 1 | 1 | 1 |
Fig. 7

United States Patent Office 3,275,986

Patented Sept. 27, 1966

3,275,986

PATTERN RECOGNITION SYSTEMS

William H. Dunn, Red Bank, N.J., Curt F. Fey, Chevy Chase, Md., and Laveen N. Kanal and William L. McDermid, Rochester, and Donald F. Smith, Pittsford, N.Y., assignors to General Dynamics Corporation, Rochester, N.Y., a corporation of Delaware Filed June 14, 1962, Ser. No. 202,529
8 Claims. (Cl. 340—146.3)

This invention relates to pattern recognition systems and is particularly directed to methods and circuits for classifying groups of randomly arranged binary digits. The pattern recognition systems of this invention are related to binary operated networks which may be preconditioned, or which are capable of being "taught" to recognize, classify, and record each of many distinct patterns.

A "pattern" as used throughout this disclosure means a group of two-valued electrical signals which can be "read" simultaneously or successively and the spacial or serial arrangement of which can be assigned meaningful classifications. The "pattern" contemplated here may comprise, for example, a two dimensional array of black and white incremental areas of a picture image familiar to the facsimile and television arts; or, the "pattern" may comprise a group of arbitrary binary digits, without spacial or picture significance, familiar to the card sorting art. In either case, the pattern may be read optically, electrically, or mechanically. For example, a raster or grid of light sensitive cells analogous to the rods and cones of the human retina for sampling the incremental areas of the image pattern are examples of sensing devices which can be employed here. Conventional single-pole switches can, of course, simulate the cells. The picture patterns may comprise not only alpha-numeric characters, but waveforms of characteristic shapes. Waveforms of phonemes can be classified for speech recognition.

The resolving power of the reading assembly or retina is determined by the number of sensing elements and the size of the incremental areas viewed by each element. Since binary or two-valued voltages and/or currents are most conveniently treated in the circuits of this invention, each incremental area of the pattern must be interpreted as either black or white.

If a raster is considered having 1024 grid-arranged sensing elements, 32 x 32, the maximum possible number of distinct patterns that can be read is the astronomical figure of $2^{1024}$. Circuitry for reliably reading and reporting out such a large number of patterns by computer-type circuitry is economically unfeasible.

Accordingly, an object of this invention is to provide an improved and simplified and economically feasible pattern recognition system.

The series of articles in the "Proceedings of the Institute of Radio Engineers" for January 1961, reviews the pattern recognition art and the article by Hawkins on pages 31 to 48 is particularly directed to the problems of recognition and learning networks. In this article, the terms "learning" and "teaching" have been used to indicate the procedure for preconditioning the pattern recognition circuitry so that a single distinct output signal will result for each one of many patterns that may be presented to the sensing elements of the network. It has been determined that by digital computation involving random search or steepest descent techniques, the electrical parameters of the networks of the system can be made to efficiently classify numbers of patterns. Unfortunately, these preconditioned or taught, with a minimum of computation recognize patterns require a vast amount of computing on a large high speed computer.

Accordingly, another object of this invention is to provide a pattern recognition system which can be rapidly precondition, or taught, with a minimum of computation and equipment, to reliably classify each of many patterns.

The objects of this invention are achieved in a system comprising an array of sensing elements each of which will yield either of two voltages. The sensing elements may be arranged in two dimensions for picture recognition or may be arranged arbitrarily for card-reading. The system also comprises a plurality of groups of electrical storage devices, or "stores." Each store is capable of containing and retaining an electrical quantity, such as an electrical charge, a current, or a voltage. This quantity or weight is preferably read in and read out in terms of binary numbers and the store may comprise the sound track of a magnetic tape, disc, or drum, or may comprise networks of digitally related impedances, such as resistances. Each store is capable of retaining its electrical contents without deterioration, during read-in and read-out, and each quantity should be capable of being incremented or decremented by the addition of +1's or −1's. The stored quantity can be preset to given values. The numerical value of the quantity in each store will hereinafter be referred to as "weights." All stores of one group are controlled by one sensing element, the number of stores in each group being determined by the number of binary digits which will be employed in a coded read-out number. Following the stores are a series of adders. The inputs of the adders are connected to one store of each of said groups of stores so that the contents of the connected stores may be added in a prescribed manner. Only those stores which have been enabled by one of the two stable states of a connected sensing element may contribute to the addition. Conveniently, gates controlled by the sensing elements may be employed to admit or not admit the contents of each store to the adder. When the sum in an adder is zero or negative, a zero appears at the adder output. When the sum in an adder is positive, a "1" appears at the adder output. These 1's and 0's at the several adder outputs comprise the binary coded output of the system.

It has been found feasible to compute, as on an IBM type digital computer, Model 704, the weights or electrical contents of each of the stores connected to a finite number of sensing elements, for recognizing and classifying each of a finite number of patterns. According to one embodiment, described in detail in the copending application, Serial No. 202,525, filed on the filing date of this application, one adder is employed for successively performing the several additions, gating and timing circuits being used to successively connect the outputs of the proper stores to the adder.

According to another important feature of this invention, the above system may be forced to "learn" to recognize and classify each of a number of patterns. This is accomplished by feedback circuits to reinforce, by additions to or subtractions from, the contents of each store. Reinforcement voltages are obtained by comparing, in a comparator circuit, the actual output of each adder with a desired output. The actual and desired outputs must, of course, be in like binary language to be compared. If the actual output was less than the desired output, the contents of the involved stores would be "reinforced" by adding +1 to increase the contents of each store. If, on the other hand, the actual output of the adder was greater than the desired output, the contents of the connected stores would be increased by 1. When the actual and the desired voltages are the same, for example, both are 0, 0 or 1, 1, no comparator output appears and no reinforcement is made. All patterns are successively presented, iteratively, until all actual and all desired adder outputs match. It has been found and is shown below that the weights of the completely connected circuits of this invention converge and that a finite number of "lessons" are required to teach the device to recognize a given number of patterns.

If the patterns are "linearly separable," the device will converge to correctly classify all of the patterns. Patterns are "linearly separable" if it is possible to classify them into the desired groups by a device which does not multiply its inputs together. If the patterns are not linearly separable, the circuits of this invention will classify the patterns so that there is a minimum number of errors. (See the section below entitled, "Theory of Pattern Recognition Network.")

Other objects and features of this invention will become apparent to those skilled in the art by referring to specific embodiments described in the following specification and shown in the accompanying drawings, in which:

FIG. 3 is a flow diagram for supporting the mathematics of the pattern recognition network of this invention;

FIGS. 4 and 5 are vector diagrams showing the limitations of the iterative method of convergence of stored weights in the pattern recognition system of this invention;

FIG. 6 shows one probability distribution of two groups of patterns; and

FIG. 7 is a table which illustrates two possible output codes which may be used in the pattern recognition system of this invention.

Figure 1:
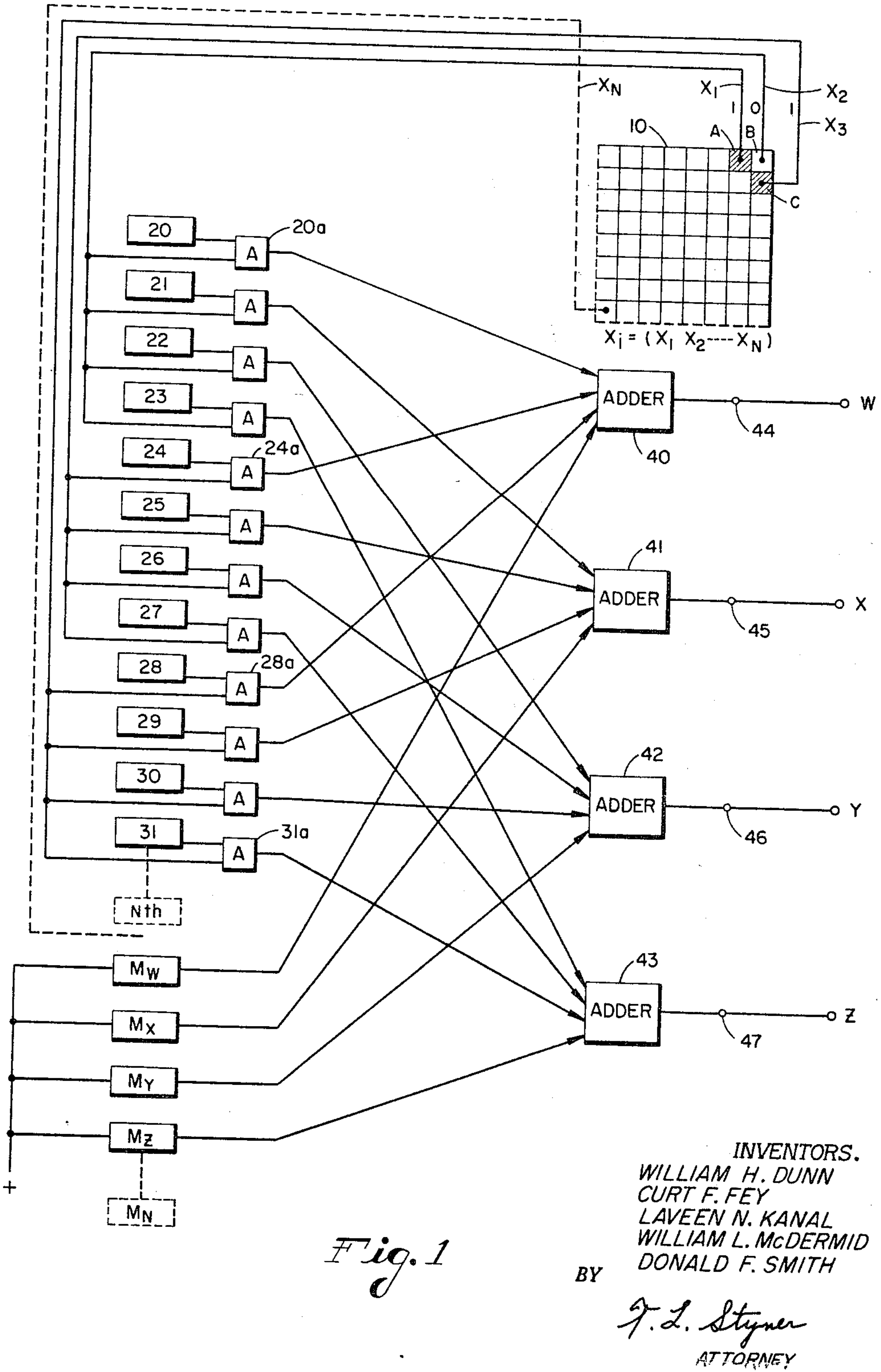
FIG. 1 is a diagram of the flow of binary information through the pattern recognition circuits of this invention.

At 10 in FIG. 1 is shown a two-dimensional arrangement of sensing elements. One array found to be useful for reading simple waveforms and alpha-numeric characters comprised 1024 elements in a 32 x 32 rectangular grid. Such a grid has reasonable resolving power and is capable of reading all of the more common typed and printed fonts of the letters of the alphabet as well as simple waveforms and geometrical figures. It will be convenient to think of each sensing element as a photocell, all of which are arranged in an optical system for viewing black and white incremental areas of a pattern. Each cell will then produce either of two voltages. These two voltages in one embodiment were −6 and 0 volts, respectively.

For the purposes of this disclosure, three only of the sensing elements, A, B and C, are shown along with sufficient circuitry to classify and read out all of the eight possible combinations of black and white patterns on those three elements. The 4th to Nth sensing elements, generally, require only a duplication of the circuits here illustrated.

Stores 20 to 31 are divided into sets, each set being connected to or controlled by one sensing element. The number of stores in each set corresponds to the number of coded output lines W, X, Y and Z, which is four in the example shown. If, for example, there were ten coded output lines, there would be ten stores connected to each sensing element. In FIG. 1, stores 20 to 23 are controlled by sensing element A, stores 24 to 27 are controlled by sensing element B, and stores 28 to 31 are controlled by sensing element C. As stated, many storage devices suitable for the system of this invention are known in the art, such as shift registers or segments of tracks on magnetic tapes, drums, or discs on which numbers can be read in and read out. It is contemplated that the contents or weights of each store may be changed upwardly or downwardly and each can be sampled and read out without deterioration or loss of the stored information. Alternatively, resistors representing proportional stored weight values will meet the requirements of this invention. One particular storage device which is treated in some detail in the copending application mentioned above comprises a reversible counter register with five stages and capable of counting up to and storing the binary number 32. The numerical content of each register may be increased or decreased by increments of one. In the embodiments considered here, gate circuits **20*a* to 31*a*** are controlled by the sensing elements and are connected to the stores so that only the devices which are "enabled" by a "1" from the connected sensing element may enter into the computations incident to the classification of a particular pattern. That is, the sensing elements do not contribute directly to changes in the contents of the registers.

The system of this invention comprises a number of independent basic networks, each of which consists of an output line, an adder, and the one store from each group which is connected to the adder. Each of these basic networks classifies all of the input patterns into two classes or groups according to whether its output is a "1" or a "0." The table of FIG. 7 shows two possible output codes, code 1 and code 2, that may be used. In this example, the input patterns consist of the letters of the alphabet, e.g., all of the patterns representing the letter A. The signal on each output line for each set of patterns is shown. When code 1 is used, the weights associated with the W network are such that a pattern A will be classified as a "1" and all other patterns will be classified as a "0." The X network will classify all patterns which are a B as a "1" and all others as "0." It can be seen that when code 1 is used, N basic networks are required to classify the patterns into N groups. Code 2 of the table of FIG. 7 is a straight binary code. The W network classifies patterns consisting of E, F, G and H as a "1" while A, B, C and D are classified as a "0."

It should be noted that while each basic network can classify the patterns into only two groups, the outputs considered jointly can classify the input patterns into many groups. When using the binary output code (code 2), N basic networks or outputs can classify the patterns into $2^N$ groups. It should also be noted that any other complete binary code, such as the various Gray codes will affect this same economy of circuits by providing $2^N$ pattern classes or groups with N basic networks.

In addition to the sensing element controlled stores, there are provided storage threshold registers $M_W$, $M_X$, $M_Y$, $M_Z$ . . . $M_N$, the function of which is to bias or shift summations of the stored weights and will be discussed below.

In FIG. 1, there are four output terminals W, X, Y and Z connected to lines 44, 45, 46 and 47 for producing, respectively, a logical 1 or 0 for each bit of a read-out number. Where there are four binary coded output lines, there are provided four adders. The adders are shown at 40, 41, 42 and 43. Each adder is connected, through gates, to one store in each of the sets of stores. Adder 40 adds the contents of stores 20, 24, 28 and $M_W$; adder 41 adds the contents of stores 21, 25, 29 and $M_X$; et cetera. The adders are of the type which when the sum of the connected inputs is zero or less than zero, a "0" appears at the output terminal of the adder, and, if the sum of the inputs is greater than zero, a "1" appears at the output terminal of the adder. Adders 40, 41, 42 and 43 all have the same operating characteristics.

In the manufacture of the character recognition device of FIG. 1, the weight content of each of the stores are computed and manually fed into the stores for a given set of patterns and responses. Because of the completeness and symmetry of the circuits, the computation of each weight may be rapidly and rigorously carried out.

The rationale of the network of FIG. 1 and the convergence of the parameters or weights of the stores for classifying each pattern of a group of patterns with a minimum of errors may be best understood by next referring to the statistical theory of the pattern recognition network of FIG. 1.

*Theory of the pattern recognition network of FIG. 1*

The pattern recognition network of FIG. 1 is considered to be essentially a filter for the separation of patterns belonging to one of several classes. The circuit structure of the filter has been determined by the application of statistical classification theory to the problem of pattern recognition. However, the storage parameters of the filter are left free to be adjusted, which it has been found may be adjusted by iterative methods.

The patterns to be classified by the network are placed on a grid 10 of sensing elements whose output is a set of binary variables $(x_i)$, where $i=1, 2, \ldots N$. Thus, any pattern may be specified as a vector, where $x$ comprises $x_1, x_2, \ldots x_N$ and the $x_i$'s are either 0 or 1. One such embodiment consists of a 32 x 32 input array. In this case, $N=1024$. The universe of patterns can be thought of as occupying an N-dimensional space and the recognition task becomes one of dividing this N-dimensional space into mutually exclusive regions $R_j$, where $j=1, 2, \ldots k$, such that when a pattern falls in $R_j$ the pattern is listed under group $j$. Because of the variability of the patterns within each group, the $x_i$, in general, have to be treated as stochastic variables. The recognition task then becomes the application of statistical inference to the classification of a pattern to one of the $k$ known groups to which it can possibly belong.

Consider first the case where the patterns can belong to one of two possible groups, i.e., the case where $k=2$. Let the groups be denoted as Group I and Group II. Then, given a pattern having a certain vector, $x=x_1 \ldots x_N$, the conditional probability that the pattern belongs to Group I is $p(1/x)$, and the conditional probability that the pattern belongs to Group II is $p(2/x)$. Thus, the boundary of the two regions for classification can be defined by the equation $$p(1/x)-p(2/x)=0 \quad (1)$$

Applying the definition of conditional probability:

$$p(1/x)=\frac{p(1, x)}{p(x)}$$

and $$p(1, x)=p(x/1)p(1) \quad (2)$$

so that $$p(1/x)=\frac{p(x/1)p(1)}{p(x)}$$

similarly $$p(2/x)=\frac{p(x/2)p(2)}{p(x)} \quad (3)$$

where $p(1)$, $p(2)$ and $p(x)$ are the unconditional probabilities of Group I, Group II and of vector $x$, respectively. $p(x/1)$ is the conditional probability of getting the vector $x$ when it is known that the pattern belongs to Group I, and $p(x/2)$ is the conditional probability of getting vector $x$ when it is known that the pattern belongs to Group II. Combining Equations 2 and 3 gives $$\frac{p(x/1)}{p(x/2)}=\frac{p(2)}{p(1)} \quad (4)$$

as the equation for the boundary defining the two regions. The ratio $p(x/1)/p(x/2)$ is called the likelihood ratio, and the two regions for classification are $$R_1\colon L(x)=\frac{p(x/1)}{p(x/2)}>\frac{p(2)}{p(1)}$$

$$R_2\colon L(x)\leq p(2)p(1)$$

More generally, the regions can be defined as $$\left.\begin{aligned} R_1\colon L(x)&=\frac{p(x/1)}{p(x/2)}>t \\ R_2\colon L(x)&\leq t \end{aligned}\right\} \quad (5)$$

where $t$ is a "threshold" number. Thus, if $L(x)$ exceeds the threshold $t$, the pattern is classified as belonging to Group I, otherwise the pattern is classified into Group II, By using different values for the threshold $t$ in Equation 5, classification of an unknown pattern into one of two groups can be done in such a way as to (*a*) minimize the probability of making an error in the assignment of the patterns to the two groups; or to (*b*) equalize the errors for the two groups; or to (*c*) minimize the expected loss, or be best, according to some other criterion. Consequently, all these objectives can be achieved by computing the likelihood ratio and adjusting the threshold according to the criterion of one's choice.

When the patterns can belong to one of $k$ groups with $k>2$, one could set up $k$ likelihood ratios and then for each likelihood ratio Group I would represent a particular group and Group II represent all the other groups. The construction of networks makes it desirable to consider a small number of likelihood ratios, and by representing the $k$ groups in a binary or other code much fewer than $k$ likelihood ratios will suffice. When this is done, each likelihood ratio considers patterns from all the $k$ groups as belonging to just two possible groups, those which should produce a 1 and those which should produce a 0. Using a binary coded representation, a network which attempted to classify correctly eight groups of patterns, such as eight letters of the alphabet, could be constructed from three likelihood ratios operating in parallel. However, while this sort of grouping of patterns reduces the size of the resulting network, it puts an added strain on the recognition task. Consequently, in some cases it may be desirable to implement $k$ likelihood ratios rather than the binary number corresponding to $k$. The use of $k$ likelihood ratios means that for each ratio we keep grouping $(k-1)$ groups of patterns together. This, in turn, may not be as good as setting up likelihood ratios for each pair of the $k$ groups. However, the latter would require $$\frac{k(k-1)}{2}$$

likelihood ratios to be implemented, and for any reasonable number $k$, $$\frac{k(k-1)}{2}$$

becomes quite large. These considerations dicate that the coded representations should be tried first, and if that does not work, $k$ likelihood ratios should be tried, and if that also fails, then $$\frac{k(k-1)}{2}$$

or some compromise number should be tried, the compromise being possible since some groups of patterns may be relatively easily distinguished from all the others, while some are not as easily separated.

*Getting the network structure from the likelihood ratio.*—We have seen that to accomplish the recognition task, we need essentially to compute a set of likelihood ratios and compare them with thresholds. We need only consider the problem of one likelihood ratio since more than one just involves a paralleling of the basic network structure needed to handle one likelihood ratio and one threshold. The basic network structure is the network shown in FIG. 3. Implementation of the basic network is shown in FIG. 1. In FIG. 1 the network consists of an adder and its associated stores. For example, output line 44, adder 40, gates 20*a*, 24*a*, 28*a*, stores 20, 24, 28, $M_w$, and sensing elements A, B, C correspond to the $x_i$ of this discussion.

The computation of the actual conditional probabilities $p(x/1)$ and $p(x/2)$ and through them, the computation of the likelihood ratios is in fact out of the question if we are interested in having networks which are not the size of a large digital computer. Thus, it is necessary to consider approximations of the conditional probabilities and the likelihood ratios which will lead to simple network implementations.

In the following paragraphs is considered a particular type of expansion for the joint probability function of N binary variables and is shown the approximations used to obtain the network structure of the pattern recognition network of this invention.

Again, let X denote the set of all points $$x=(x_1, x_2 \ldots x_N)$$

in the N-dimensional space, with each $x_i$ being 0 or 1, and let $p(x/j)= \ldots p((x_1, x_2 \ldots x_N)/j)$ denote the joint probability function of the $x_i$ in the $j$th group, where $j=1, 2 \ldots k$. Since there are $2^N$ points in X, any parametric description of an arbitrary probability function will, in general, require $(2^N-1)$ independent parameters. Consider a particular parametric representation. As pointed out before, each likelihood ratio only discriminates between two groups, so that the general case of $k<2$ is taken care of by considering $k=2$. Define, now, the following parameters for the two groups.

Group I:

$m_i=p(x_i=1)$, $0<m_i<1$ $z_i=(x_i-m_i)/\sqrt{m_i(1-m_i)}$ $r_{ij}=E(z_iz_j)$, $1<j$ $r_{ijk}=E(z_iz_jz_k)$, $i<j<k$ $r_{12 \ldots N}=E(z_1, z_2 \ldots z_N)$ Group II:

$n_i=p(x_i=1)$, $0<n_i<1$ $y_i=(x_i-n_i)/\sqrt{n_i(1-n_i)}$ $s_{ij}=E(y_iy_j)$, $i<j$ $s_{ijk}=E(y_iy_jy_k)$, $i<j<k$ $s_{12 \ldots N}=E(y_1y_2 \ldots y_N)$ where the $m_i$ and $n_i$ are, respectively, the means in the two groups; $z_i$ and $y_i$ are normalized variables obtained in the usual way by subtracting the mean value of the variable from the variable and dividing the result by the standard deviation; and $r_{ij}, r_{ijk} \ldots$, and $s_{ij}, s_{ijk} \ldots$ are the "correlation parameters in the two groups. The mean, $m_i$, is the number of times the input (sensing element) $x_i$ takes on the value 1 when a pattern from Group I is shown, divided by the number of patterns from Group I. When the inputs $x_i$, are restricted to values of 0 to 1 (as in the case here), $m_i$ is the probability that $x_i$ will be one when a pattern is from Group I. It can be shown rigorously that the following type of expansions hold for the two probability functions $p(x/1)$ and $p(x/2)$.

$$p(x/1)\left[\prod_{i=1}^{i=N} m_i^{x_1}(1-m_i)^{(i-x_1)}\right]\cdot\left[1+\sum_{i<j} r_{ij}z_iz_j+ \ldots \sum_{i<j<k} r_{ijk}z_1z_jz_k+r_{12-N}z_1z_2 \ldots z_N\right] \quad (6)$$

where $\pi$ is a product symbol.

For each expansion there are $2^N-N-1$ correlation parameters and N mean values. It is now evident why it is necessary to approximate the probability functions by dropping terms within the brackets of the above expression.

The classification functions and corresponding networks which result when various approximations to the probability functions $p(x/1)$ and $p(x/2)$ are used in a likelihood ratio can now be derived. Substituting the expansions for $p(x/1)$ and $p(x/2)$ in the likelihood ratio we get $$L(x)=\frac{\left\{\prod_{i=1}^{i=N} m_i^{x_i}(1-m_i)^{(1-x_i)}\right\}\left\{1+\sum_{i<j} r_{ij}z_iz_j+\sum_{i<j<k} r_{ijk}z_iz_jz_k+\ldots\right\}}{\left\{\prod_{i=1}^{i=N} n_i^{x_i}(1-n_i)^{(1-x_i)}\right\}\left\{1+\sum_{i<j} s_{ij}y_iy_j \sum_{i<j<k} s_{ijk}y_iy_jy_k+\ldots\right\}} \quad (7)$$

If a "first order" approximation is used, only the first term in the brackets in the numerator and denominator of $L(x)$ is used. This implies an assumption of independence of the $x_i$, because essentially we are saying that all the "correlation parameters" are zero. The first order approximation gives:

$$L(x)=\frac{\prod_{i=1}^{i=N} m_i^{x_i}(1-m)^{(1-x_i)}}{\prod_{i=1}^{i=N} n_i^{x_i}(1-n_i)^{(1-x_i)}} \quad (8)$$

Nothing changes if we take the log of $L(x)$ instead of using $L(x)$, since then we just use the log of the threshold values also.

$$\text{Log } L(x)=\sum_{i=1}^{N}(a_i^{(1)}x_i+c_i) \quad (9)$$

where $$a_i^{(1)}=\log \frac{m_i}{n_i}\left(\frac{1-n_i}{1-m_i}\right) \quad (10)$$

and $$c_i=\log \frac{1-m_i}{1-n_i} \quad (11)$$

The summation over $c_i$ can be absorbed in the threshold and a particular weighted sum of the $x_i$ is obtained. A flow diagram of the resulting network is shown in FIG. 3 where the binary valued inputs $x_1, x_2 \ldots x_N$ are associated with the storage elements, respectively, $a_1, a_2 \ldots a_N$, the contents of the storage elements being summed as shown to produce an output signal of 1 or 0 after the summation has been compared with a threshold, $M_N$. The resulting network is:

$$R_1\colon \sum_{i=1}^{N} a_i^{(1)}x_i>T \quad (12)$$

$$R_2\colon \sum_{i=1}^{N} a_i^{(1)}x_i\leq T \quad (13)$$

Equation 12 and 13 may be rewritten as:

$$R_1\colon \sum_{i=1}^{N} a_ix_i-T>0 \quad (12a)$$

$$R_2\colon \sum_{i=1}^{N} a_ix_i-T\leq 0 \quad (13a)$$

where the threshold term has been moved to the left side of the equation. FIG. 1 is an implementation of four basic networks, each network computes a likelihood ratio as described by Equation 12*a* and 13*a*. The $x_i$'s are the inputs A, B, C, etc., and the weights in the associated stores are the $a_i$'s. The stores $M_w$, etc., contain weights of quantity (—T) so that the adder makes a comparison with zero as in Equations 12*a* and 13*a* rather than with the threshold T as in FIG. 3 and Equations 12 and 13.

If a second order approximation to the likelihood ratio is used, we get $$\text{Log } L(x)=\sum_{i=1}^{N} a_i^{(1)}x_i+\log\left[1+\sum_{i<j} r_{ij}z_iz_j\right]-\log\left[1+\sum_{i<j} s_{ij}y_iy_j\right]+\text{constant} \quad (14)$$

Using the approximation $\log(1+\theta)\approx\theta$ and letting $$u_{ij}=r_{ij}/\sqrt{m_i(1-m_i)(1-m_j)} \quad (15)$$

and $$V_{ij}=s_{ij}/\sqrt{n_i(-n_i)n_j(1-n_j)} \quad (16)$$

Equation 14 becomes $$\sum_{i=1}^{N}\left\{\left(a_i^{(1)}+\sum_{j\neq i}(-m_ju_{ij}+n_iv_{ij})\right)\right\}x_i+\sum_{i<j}(u_{ij}-v_{ij})x_ix_j \quad (17)$$

Now, if $u_{ij}=v_{ij}$, the resulting classification function is represented by the same network as above, but now the coefficients are $$a_i^{(2)}=a_i^{(1)}+\sum_{j\neq i}(-m_j+n_j)v_{ij} \quad (18)$$

We can show that in this manner a set of classification functions, which are all linear weighted sums of the $x_i$, are obtained corresponding to increasing orders of approximation to the joint probability functions, namely, $$\sum_{i=1}^{i=N}a_i^{(1)}x_i;\ \sum_{i=1}^{i=N}a_i^{(2)}x_i;\ .\ .\ .\ \sum_{i=1}^{i=N}a_i^{(N)}x_i \quad (19)$$

That is, $$\sum_{i=1}^{i=N}a_i^{(1)}x_i$$

is the first order approximation to the log of the likelihood ratio; and $$\sum_{i=1}^{i=N}a_i^{(2)}x_i$$

is the approximation including the second order term to the log of the likelihood ratio. In this manner, $$\sum_{i=1}^{i=N}a_i^{(N)}x_i$$

is the approximation including the Nth order term to the log of the likelihood ratio. As a result of the iterative learning procedure referred to below, there is obtained a set of linear classification functions of the form $$\sum_{i=1}^{i=N}a_ix_i$$

which are compared against thresholds. Each linear classification function together with its threshold is implementing an approximation to the likelihood ratio and it could be near any one of the above derived linear classification functions, viz., $$\Sigma a_i^{(1)}x_i,\ \Sigma a_i^{(2)}x_i,\ .\ .\ .\sum_{i=1}^{i=N}a_i^{(N)}x_i$$

The linear classification function obtained by iteration in the practical case is obtained in such a way as to do the separation of groups exactly, or, where that is not possible, in such a way as to minimize the total misclassification.

Figure 2:
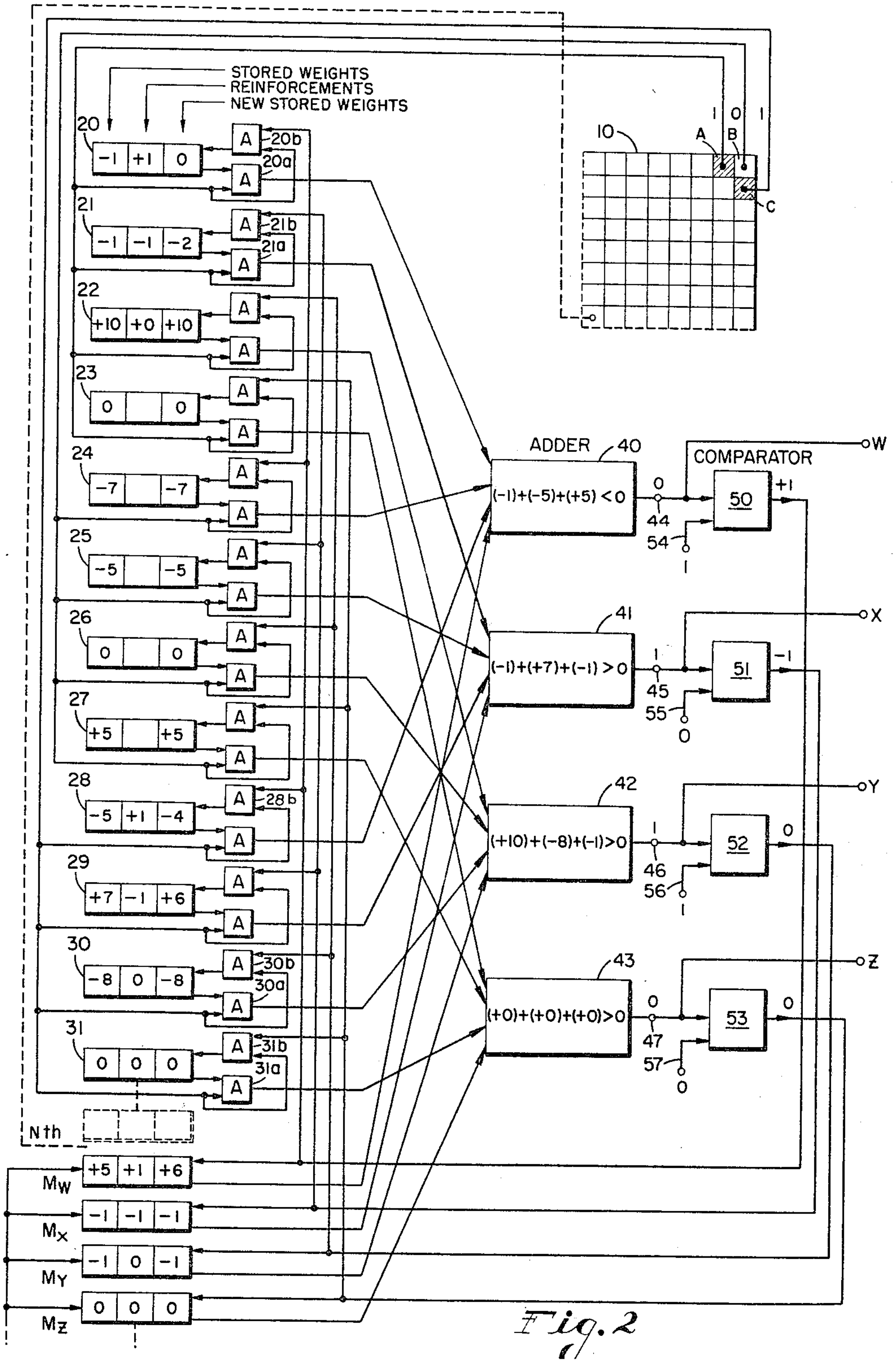
FIG. 2 is a diagram of the flow of binary information through the learning circuits of this invention.

The network implementing each of these classification functions is, it will be noted, the network illustrated in FIG. 1. By choosing other coefficients (weights), the same network can implement other classification functions. It will be apparent that a particular set of weights can be chosen in such a way as to maximize the ratio of distance between means of the groups to variance within the groups, and the coefficients so obtained discriminate best between two groups according to this criterion. According to this invention, fixed circuit configurations are employed, but which circuits are adaptive. That is, coefficients or weights are adjusted step-by-step in such a manner that the set $a_1, a_2 \ldots a_N$ will converge to the desired set of values. In FIG. 2 is shown one self-teaching network for converging step-by-step storage weights. By a feedback technique, next discussed, the stores 20 to 31 are reinforced by information obtained within the system for the desired convergence.

*Reinforcement of storage*

If the robot character of the pattern recognition system of FIG. 1 is not desired because, in the field, it may be necessary to occasionally "teach" the machine to read new characters, a system of feedback circuits are provided, as shown in FIG. 2. In FIG. 2, the actual responses of each pattern at output lines 44, 45, 46 and 47 are compared in comparators 50, 51, 52 and 53 with the desired responses. The set of desired responses are applied to the input terminals 54, 55, 56 and 57 of the comparators. The other input of each comparator comprises, respectively, the outputs of the adders. The teaching process merely consists of successively presenting each pattern to the raster 10 and simultaneously applying the desired binary number responses to terminals 54–57. The comparators 50, 51, 52 and 53 are each of the type which will produce an output 0 when the two inputs are alike and will produce a +1 or a −1 when the actual outputs are, respectively, less than or greater than the desired outputs. That is, a +1 is produced at the output of a comparator when the actual adder output is 0 and the desired output is 1, and will produce a −1 when the actual adder output is 1 and the desired output is 0. Feedback circuits are connected from each comparator output to those stores which contributed to the adding and comparison operation, including the "M" threshold registers. Each "lesson," or trial of actual and desired responses, results in a positive or negative change or reinforcement of the store weight to reduce the errors. By successively presenting the patterns and desired responses, the weights in the stores converge on values which produce matched inputs to the comparators for all patterns. By high speed switch gear, these successive patterns may be rapidly applied and the complete teaching operation considerably accelerated.

An example of one "lesson" or teaching operation of the circuits of FIG. 2 may be useful. Assume that sensing elements A and C are illuminated or otherwise activated, and B is not illuminated, to generate binary voltages 1, 0 and 1, respectively, on the leads to elements A, B and C. For convenience in reading the specific numbers mentioned below in this example, the existing numerical weight counts in the stores 20 to 31 are indicated in the left vertical row of numbers in the rectangles. Additions of +1, 0 or −1 by feedback to the existing weights are shown in the next vertical row and the new weights are shown in the third vertical row. In the assumed example, sensing element B puts out a 0 so that the stores 24, 25, 26, and 27 associated with element B are disabled and cannot enter into the adding process. However, sensing elements A and C each applies an enabling 1 to the gates of stores 20, 21, 22, 23 and 28, 29, 30, 31 and permits those stores to participate in the adding process. In this example, adder 40 is called upon to add −1, −5 and +5, while adder 41 is called upon to add −1, +7 and −1, adder 42 is called upon to add +10, −8 and −1, and adder 43 adds 0, 0 and 0. Since the sum in adder 40 is less than 0, a 0 appears at terminal 44. In adder 41, since the sum of −1, +7 and −1 is greater than 0, a 1 appears at terminal 45. Similar additions in 42 and 43 produce a 1 and a 0, respectively, at terminals 46 and 47, so that the actual output code number appearing at terminals 44–47 is 0, 1, 1, 0. Assume, however, that the desired coded output is 1, 0, 1, 0, and that these four bits are applied, respectively, to the four input terminals 54–57 of the comparators. Since the actual and desired binary bits are the same in comparators 52 and 53, the outputs of those two comparators are each 0. But, since the desired input W of comparator 50 is 1, while the actual input is 0, a +1 appears at the output of comparator 50. This +1 is fed back to the stores and gates 20*b* and 28*b* admit this +1 to stores 20, 28, to increase the numerical content of these two stores. The same feedback signal is applied to threshold store $M_W$ to increase its numerical content. Finally, since the actual output of adder 41 is 1 and the desired output is 0, the comparator output is −1 which is fed back to stores 21 and 29 to decrease the contents of those two stores, and to decrease the contents of $M_X$. According to the iterative learning procedures of the system of FIG. 2, the next pattern of A, B and C is presented to the sensing elements and the desired binary output at W, X, Y and Z is fed into the comparators on lines 54, 55, 56 and 57, and the appropriate reinforcements fed back. At the completion of each reinforcement, the next pattern is presented along with the desired output and reinforcement is repeated. Each of the patterns are successively presented along with the desired binary outputs and the process is repeated until the stored weights converge to a set of weight values which will correctly classify each of the patterns. It will now be shown that by iteratively incrementing and decrementing the stored weights in the stores, the stored weights of all of the stores can converge to values, if they exist, which for each pattern produce a binary output on the output lines which match the desired output for the pattern.

*Iteration and convergence*

The iteration and convergence rationale will now be considered to demonstrate the practicalities and limitations of the system of FIG. 2. Again, let it be assumed that each pattern or input vector $x$ comprises $$(x_1, x_2 \ldots x_N)$$

and that vectors $x$ belong in Group I when the summation of $a_i x_i$, from $i=0$ to $i=N$, is greater than 0, and vectors $x$ belong in Group II when this summation is less than 0. That is:

$$\begin{cases} \sum_{i=0}^{i=N} a_i x_i > 0 \text{ for vectors } x \text{ belonging to Group I} \\ \sum_{i=0}^{i=N} a_i x_i < 0 \text{ for vectors } x \text{ belonging to Group II} \end{cases} \quad (20)$$

The expression in Equation 20 may include a $(a_0 \cdot x_0)$ term which takes care of the "threshold" input of Equations 12*a* and 13*a*. Now let $$R_d = \text{desired response} = \begin{cases} 1 \text{ for Group I} \\ 0 \text{ for Group II} \end{cases}$$

Also let $$r = 2R_d - 1 = \begin{cases} +1 \text{ if } R_d = 1 \\ -1 \text{ if } R_d = 0 \end{cases}$$

Then both conditions of Equations 20 can be written as the single expression.

$$\sum_{i=0}^{i=N} a_i r x_i > 0 \quad (20a)$$

or $$\sum_{i=0}^{i=N} a_i y_i > 0 \quad (21)$$

where $y_i = r x_i$ and the vector $y = (y_0, y_1 \ldots y_n)$ is called the class tagged input vector, hereafter called the CTI vector.

Now, in vector notation $\Sigma a_i y_i > 0$ becomes $A \cdot Y > 0$. Where the "·" refers to the scalar product of the weight, $A = (a_0, a_1 \ldots a_n)$, and the CTI vector, $y = y_0, y_1, \ldots y_n$.

Now, $$A \cdot y > 0 \text{ gives } |A||Y| \cdot \cos\theta > 0 \quad (22)$$

where $\theta$ is the angle between the weight vector and the class tagged input vector, as shown in FIG. 4. For all weight vectors and CTI vectors for which $\theta$ is between −90° and +90°, Equation 22 will be true. Conversely, for a given set of CTI vectors, we wish to find a set of weights, denoted by A*, such that the angle between A* and the CTI vector farthest away from it, denoted by Y*, is still an acute angle. The angle between A* and Y*, shown in FIG. 5, will be called $\theta^*$. In order for the inputs to be separated by the classification function being considered then, $-90 < \theta^* < +90$, and $|A^*||Y^*| \cos\theta^* > 0$. When this is the case, then for any other CTI vector Y it will be true that $|A^*||Y| \cos\theta > 0$, and also, $$A^* \cdot Y = |A^*||Y| \cos\theta \geqslant |A^*||Y| \cos\theta^* \quad (23)$$

Consider now the case where the classes are separable by a linear classification function, and where $x_i = 0$ or 1. In this case where a solution exists, it will be shown that this solution will be found in a finite number of trials by the learning procedure described above. Incremental changes, $\Delta a_i$, in this procedure are given by:

$$\left\{\begin{array}{l} \Delta a_i = 0 \text{ if } R_{desired} = R_{actual} \\ \Delta a_i = 0 \text{ if } x_i = 0 \\ \Delta a_i = +1 \text{ if } x_i = 1, \text{ and } R_d = +1,\ R_{act} = 0 \\ \Delta a_i = -1 \text{ if } x_i = 1, \text{ and } R_d = 0,\ R_{act} = +1 \end{array}\right\} \quad (24)$$

All this information in Equation 24 is included in the following statement:

$$\Delta a_i = (R_d - R_{act}) x_i \quad (25)$$

The change in the vector of weights is then $$\Delta A = \begin{cases} 0 \text{ if } R_d = R_{act} \\ rX = Y, \text{ otherwise} \end{cases} \quad (26)$$

where $$r = \begin{cases} +1 \text{ if } R_d = 1,\ R_{act} = 0 \\ -1 \text{ if } R_d = 0,\ R_{act} = +1 \end{cases} \quad (27)$$

so that the $r$ defined in Equation 27 is the same as the $r$ of Equation 20*a*.

Suppose we start from some arbitrary set of weights; call this vector A (see FIG. 4), and we wish to get A*, where A* is the vector desired, as defined in the previous section. Let $\alpha$ be the angle between A and A*. The projection of A on A* is then given by $$B = |A| \cos\alpha = \frac{A \cdot A^*}{|A^*|} \quad (28)$$

Also from Equation 23, $A^* Y \geqslant |A^*||Y| \cos\theta^*$. Now, if the input vectors $x = (x_1, x_2, \ldots x_N)$ contain at least one element $x_i$ which is not zero, then the class tagged input vector Y will have a magnitude of at least 1, that is, $|Y| \geqslant 1$. Thus, $$A^* Y \geqslant |A^*| \cos\theta^* \quad (29)$$

Now, if $R_d$ does not equal $R_{actual}$, then the change in the projection vector B will be $$\Delta B = \frac{A^* \cdot \Delta A}{|A^*|} = \frac{A^* \cdot Y}{|A^*|} \geq \left|\frac{A^*}{A^*}\right| |Y| \cos\theta^* \quad (30)$$

$$\therefore \Delta B \geqslant \cos\theta^*$$

Also, after the change, see FIG. 4, the magnitude of the new vector A will be $$|A^1|^2 = (|A| - |Y| \cos(180-\theta))^2 + \{|Y| \sin(180-\theta)\}^2$$

or $$|A^1|^2 = |A|^2 + |Y|^2 + 2|A||Y| \cos\theta$$

$$\therefore \Delta|A|^2 = |A^1|^2 - |A|^2 = 2|A||Y| \cos\theta + |Y|^2 = 2A \cdot Y + |Y|^2$$

Now if every $x_i = +1$, then $|Y| = \sqrt{N+1}$ and this is the maximum value that $|Y|$ can take on. Further, if $A \cdot Y > 0$, the $R_d = R_{act}$ and no change occurs, so that when a change occurs $A \cdot Y < 0$ and 0 is an upper bound for $A \cdot Y$.

$$\therefore \Delta|A|^2 \leqslant (N+1) \quad (31)$$

If changes were made on $n$ trials $$B_n \geqslant B_o + n \cos\theta^* \quad (32)$$

Also $$\Delta_n |A|^2 \leqslant n(N+1) \quad (33)$$

So that $$|A_n|^2 \leqslant |A_o|^2 + n(N+1) \quad (34)$$

As stated above, a sufficient condition for the separation of all inputs into two classes is that for any CTI vector, $AY > 0$. Consider FIG. 5 which illustrates the case where the Y* vector farthest away from A satisfies the condition $A \cdot Y^* > 0$. This means that $$\alpha + \theta^* < 90° \text{ or } \theta^* < 90° - \alpha \quad (35)$$

Then, $$\tan\theta^* < \tan(90° - \alpha) = \cot\alpha \quad (36)$$

But, $$\cot\alpha=\frac{|A|\cos\alpha}{\sqrt{|A|^2-\{|A|\cos\alpha^2\}}}=\frac{B}{\sqrt{|A|^2-B^2}} \quad (37)$$

where B is as defined in Equation 28.

Thus, $$\tan\theta^*<\frac{B}{\sqrt{|A|^2-B^2}}$$

or $$B^2-\{|A|^2-B^2\}\tan^2\theta^*>0 \quad (38)$$

or $$B^2(1+\tan^2\theta^*)-\{|A|^2\tan^2\theta^*\}>0$$

or $$B^2\sec^2\theta^*-|A|^2\tan^2\theta^*>0 \quad (39)$$

At the $n$th iteration, the A and B referred to are given by Equations 32 and 34. Substituting these in Equation 39 gives for the lefthand side of 39.

$$(B_0+n\cos\theta^*)^2\sec^2\theta^*-\{|A_0|^2+n(N+1)\}\tan^2\theta^* \quad (40)$$

If this expression is greater than 0, then certainly $$B_n^2\sec^2\theta^*-|A_n|^2\tan^2\theta^*>0 \quad (41)$$

The first term in (41) is greater than the first term in (40) and the second term in (41) is less than the second term in (40). Therefore, an upper bound for $n$ can be found by considering the condition that (41) is positive, i.e., that (41) is positive, i.e., that $$\{B_0^2+2B_0n\cos\theta^*+n^2\cos^2\theta^*\}\sec^2\theta^*-|A_0|^2\tan^2\theta^*-n(N+1)\tan^2\theta^*>0$$

or $$n^2+n\{2B_0\sec\theta^*-(N+1)\tan^2\theta^*\}+B_0^2\sec^2\theta^*-|A_0|^2\tan^2\theta^*>0 \quad (42)$$

The roots of this quadratic equation are:

$$n>\frac{-2B_0\sec\theta^*-(N+1)\tan^2\theta^* \ldots \pm\sqrt{\{2B_0\sec\theta^*-(N+1)\tan^2\theta^*\}^2-4B_0^2\sec\theta^*+|A_0|^2\tan^2\theta^*}}{2} \quad (43)$$

Keeping the largest positive root we get the condition that $$n>\left(\frac{N+1}{2}\right)\tan^2\theta^*-B_0\sec\theta^* \ldots +\frac{\sqrt{[(N+1)\tan^2\theta^*-4B_0\sec\theta^*](N+1)\tan^2\theta^*+4|A_0|^2\tan^2\theta^*}}{4} \quad (44)$$

If $A_0=0$, then $B_0=0$ and (44) becomes $$n>(N+1)\tan^2\theta^* \quad (45)$$

Equation 45 gives an upper bound on the number of iterations, $n$, to obtain convergence. The condition for a solution requires that the inputs are linearly separable, i.e., $\theta^*<90°$. From Equation 32 we see that the procedure used leads to a projection, B, of A on A*, which, for $\theta^*<90°$ as $n$ becomes large, keeps on increasing, according to $$B_n\geqslant n\cos\theta^* \quad (46)$$

while the weight vector itself has a magnitude $$|A_n|\leqslant\sqrt{n(N+1)} \quad (47)$$

Thus, the number of iterations cannot increase indefinitely since then the projection B, of A on A*, would be greater than A itself, and this is not possible. Thus the learning procedure used leads to the desired set of weights A* in a finite number of trials, the number of trials, in the worst case, being given by the bound of Equation 45. In practice, the number of iterations needed will be generally much fewer.

*Thresholds*

In the system of FIG. 2, a single threshold value is employed, the particular threshold value being 0. The system determines whether the sum of the weights in each summation process is greater than or less than zero and makes appropriate reinforcement of the weights contributing to that sum. While the threshold value may be other than zero, zero is preferred since a distinct binary 1 or 0 is convenient in the W, X, Y, Z-type of output. Since the desideratum is a set of converged weights, the sums thereof will probably not be 1 or 0 and it becomes necessary to bias the sum to the zero level regardless of the converged weight values. According to this invention, the bias is supplied by threshold stores M, one bias device being required for each summing operation. Where there are four output lines W, X, Y and Z, four summing operations are required and four biases are required. The four biases are obtained from stores $M_w$, $M_x$, $M_y$ and $M_z$.

The order of the bias is suggested in FIG. 6 in which the sum of the weights of the stores are plotted, on the S axis, against the probability P of the sum falling in either group A or B. The curve P(S|A) shows the probability that a pattern from group A will produce a sum S, while P(S|B) shows the probability that a pattern from group B will produce a sum S. In some cases it is to be expected that there will be some overlap of the two probability regions and corresponding ambiguity. In FIG. 6, the crossover point of the two regions falls at summation $t_0$ for the addition for the W output. If, now, the $M_w$ bias equals $t_0$, the entire curve can be shifted so that summations in groups A and B will fall on the minus and plus sides, respectively, of the P ordinate. Similar curves may be drawn for the summations for the X, for the Y, and for the Z outputs, each bias $M_x$, $M_y$ and $M_z$, respectively, being automatically adjusted by reinforcements to shift the curves to the right or left so that axis $t_0$ equals zero.

The pattern recognition system of this invention is simple and economically feasible. The coded outputs W, X, Y, Z . . . N serve to minimize the number of networks for reliably classifying a given number of patterns. The networks of the pattern recognition system of this invention are symmetrical and are fixed, but have adaptive and convergible parameters for classifying patterns. The system of this invention can be preconditioned by computed storage weights for classifying a predetermined set of patterns, or, the system can be self-taught or made to "learn" to coordinate any set of patterns with desired binary coded outputs.

Modification may be made in the system of this invention without departing from the scope of the invention as described in the above specification and defined in the appended claims.

What is claimed is:

1. A pattern recognition system for classifying, by a coded binary number, each of many patterns of an array of two-valued signals, said system comprising an array of sensing elements for deriving said signals, a plurality of groups of storage devices, the storage devices of each group being enabled and disabled, respectively, by the two values of a different one of said signals and each storage device containing a numerically weighted parameter capable of incremental changes, and a plurality of adders, each adder being associated with one storage device of each of said groups to produce a logical 1 or 0 determined by, respectively, summations of said weighted parameters of enabled storage devices which are above and below predetermined threshold values.

2. The character pattern recognition system of claim 1 further comprising a plurality of comparators each with a first and a second input circuit and with an output circuit, means for applying signals representing desired binary numbers to said second input circuits of each of said comparators, said first input circuits of different ones of said comparators being coupled separately to different ones of said adders, means for applying the bits of binary numbers characteristic of the patterns to be recognized to said second input circuits of said comparators, and feedback circuits from the output circuits of said comparators to the storage devices which are associated with the adder which is coupled to the input circuit thereof for incrementing said stored quantities either negatively or positively to converge said stored quantities to optimum values for correctly reading and classifying said patterns.

3. A pattern recognition system comprising an array of sensing elements, each sensing element capable of two distinct signals, a plurality of groups of stores, each store being of the type which can contain and retain a numerically weighted quantity that can be read out without deterioration, a plurality of adders, the input of each adder being coupled to one store of each of said groups and each adder being capable of summing the contents of all connected stores, biasing means for normalizing the summations to produce either value of a binary digit in response, respectively, to each summation of less than or greater than a threshold value, means connected to each sensing element and responsive to said two distinct signals to, respectively, connect the related stores to and disconnect the stores from said adders, and a plurality of readout lines coupled, respectively, to the normalized output circuits of said adders to produce a coded binary number for each pattern of sensing element signals.

4. A pattern recognition system for classifying each of a plurality of patterns of observable signals, said system comprising (a) an array of sensing elements responsive to said signals; and (b) a plurality of networks each for computing a different bit of a binary number corresponding to the likelihood ratio of said observable signals being a particular one of said plurality of patterns, each of said networks having:

(1) an output line on which a bit representing signal appears;

(2) a plurality of devices, each having storage for binary digits having a value corresponding to a certain one of said plurality of bits, each of said devices corresponding to a different one of said sensing elements, and (3) means controlled by said sensing elements for accumulating the digits in the devices corresponding thereto for providing on said network output line said bit representing signal, the value of which depends upon the accumulated value of said stored digits with respect to a predetermined value.

5. The invention as set forth in claim 4, wherein the numerical value of the digits stored in said devices are fixed.

6. The invention as set forth in claim 4, wherein the numerical value of digits stored in said devices is variable.

7. A system for recognizing a pattern made up of a plurality of elements comprising (a) a plurality of groups of weight value storage devices, each group corresponding to a different one of said elements, (b) means controlled by said elements for accumulating the weight values stored in different ones of said storage devices and deriving numerical representation thereof, and (c) means for comparing each of said representations with numerical representations corresponding to the pattern to be recognized and for changing the contens of said storage devices in accordance with the results of said comparison to set the values of said weights to optimum settings characteristic of the pattern to be recognized.

8. A pattern recognition system comprising (a) a plurality of sensing elements for producing binary signals in response to different portions of the pattern to be recognized, (b) a plurality of groups of storage devices for storing a count, different devices in each of said groups corresponding to different ones of said elements, (c) a plurality of adders, each for providing an output representing a numerical value, (d) means under the control of said elements for applying the counts stored in those of said devices corresponding to the same element to separate ones of said adders, (e) a plurality of comparators, each responsive to the output of a different one of said adders for providing a digital output having a value corresponding to the sense of the difference between the numerical value of the adder output and the numerical value of an output for a pattern to be recognized, and (f) means under the control of said elements for incrementing, decrementing and retaining the count in the devices corresponding thereto in accordance with the digital output of the one of the comparators which is responsive to the one of said adders which accumulates the count from their said corresponding devices.

References Cited by the Examiner

UNITED STATES PATENTS

| | | | |
|---|---|---|---|
| 3,069,079 | 12/1962 | Steinbuch | 340—146.3 |
| 3,104,369 | 9/1963 | Rabinow | 340—146.3 |
| 3,191,149 | 6/1965 | Andrews | 340—146.3 |

MAYNARD R. WILBUR, *Primary Examiner.*

MALCOLM A. MORRISON, DARYL W. COOK, *Examiners.*

J. S. IANDIORIO, J. E. SMITH, *Assistant Examiners.*